United States Patent
Bates et al.

(10) Patent No.: US 9,833,939 B2
(45) Date of Patent: Dec. 5, 2017

(54) PLURAL BLOW MOLDING WITH SERVO CONTROLS

(71) Applicant: Amcor Limited, Hawthorn, Victoria (AU)

(72) Inventors: Peter Bates, Chelsea, MI (US); Frederick C. Beuerle, Jackson, MI (US); Reinhard C. J. Luchies, Ann Arbor, MI (US)

(73) Assignee: Amcor Limited, Hawthorn, Victoria (AU)

( * ) Notice: Subject to any disclaimer, the term of this patent is extended or adjusted under 35 U.S.C. 154(b) by 230 days.

(21) Appl. No.: 14/358,148

(22) PCT Filed: Nov. 13, 2012

(86) PCT No.: PCT/US2012/064804
§ 371 (c)(1),
(2) Date: May 14, 2014

(87) PCT Pub. No.: WO2013/074509
PCT Pub. Date: May 23, 2013

(65) Prior Publication Data
US 2014/0333013 A1     Nov. 13, 2014

Related U.S. Application Data

(60) Provisional application No. 61/560,098, filed on Nov. 15, 2011.

(51) Int. Cl.
*B29C 49/28* (2006.01)
*B29C 49/78* (2006.01)
(Continued)

(52) U.S. Cl.
CPC .............. *B29C 49/28* (2013.01); *B29C 49/78* (2013.01); *B29D 22/003* (2013.01);
(Continued)

(58) Field of Classification Search
None
See application file for complete search history.

(56) References Cited

U.S. PATENT DOCUMENTS 3,937,610 A * 2/1976 Farrell .................... B29C 49/66
425/526
4,344,749 A * 8/1982 Fritz .................. B29C 45/7207
264/530
(Continued)

FOREIGN PATENT DOCUMENTS

CN      201597178 U    10/2010
DE        4443195 A1    6/1996
(Continued)

OTHER PUBLICATIONS

International Search Report and Written Opinion for PCT/US2012/064804, mailed Mar. 26, 2013; ISA/KR.
(Continued)

*Primary Examiner* — Monica Huson
(74) *Attorney, Agent, or Firm* — Harness, Dickey & Pierce, P.L.C.

(57) ABSTRACT

A system for forming a container from a preform includes a first mold having a plurality of first portions that cooperate to define a first internal surface against which the preform is blown for forming a first form. The system also includes a second mold having a plurality of second portions that cooperate to define a second internal surface against which the first form is blown for forming a second form. Also, the system includes a mold servo motor that actuates the plurality of first portions relative to each other and/or actuates the plurality of second portions relative to each other. Furthermore, the system includes a controller that controls the mold servo motor for controlled actuation of the plurality of first portions and/or the plurality of second portions.

17 Claims, 3 Drawing Sheets

| | 1 | 2 | 3 | 4 | 5 | 6 | 7 | 8 |
|---|---|---|---|---|---|---|---|---|
| | CSR | Base with Overstroke | Stretch Rod | Mold | High Pressure | Low Pressure | Hot Air | Vacuum |
| Operation | Up/Down | Up/Down | Up/Down | Open/Middle/Close | Open/Close | Open/Close | Open/Close | Open/Close |
| Comments | Operates as Normal but is Forced Downward Thus Depressing the Article into the Mold Past the Base | Delayed Operation for Overstroke and Additional Time for Touch Off on Article (cry. Growth) | Operates as Normal Unless Hot Air is Utilized (Will Remain up until Air Time is Complete) | Closes as Normal but is Opened to Middle Position to to Assist With Latent Heat Transfer to Article (Additional Shrinkage) | | | | |
| | Servo Motor Driven | | | | N/C Solenoid Valves | | | |

Primary Station I/O

(51) Int. Cl.
    *B29D 22/00*     (2006.01)
    *B29L 31/00*     (2006.01)
    *B29C 49/06*     (2006.01)
    *B29C 49/12*     (2006.01)
    *B29C 49/14*     (2006.01)
    *B29C 49/18*     (2006.01)
    *B29C 49/42*     (2006.01)
    *B29L 22/00*     (2006.01)

(52) U.S. Cl.
    CPC ............... *B29B 2911/14333* (2013.01); *B29B 2911/14366* (2013.01); *B29B 2911/14386* (2013.01); *B29C 49/06* (2013.01); *B29C 49/12* (2013.01); *B29C 49/14* (2013.01); *B29C 49/185* (2013.01); *B29C 49/4236* (2013.01); *B29C 2049/129* (2013.01); *B29C 2791/006* (2013.01); *B29C 2791/007* (2013.01); *B29C 2793/009* (2013.01); *B29C 2793/0027* (2013.01); *B29L 2022/00* (2013.01); *B29L 2031/716* (2013.01)

(56) References Cited

U.S. PATENT DOCUMENTS

| | | |
|---|---|---|
| 4,946,367 A | 8/1990 | Nakamura |
| 5,244,610 A * | 9/1993 | Kitzmiller ............... B29C 49/78 |
| | | 264/40.1 |
| 5,269,672 A | 12/1993 | DiGangi, Jr. |
| 5,975,880 A | 11/1999 | Takada et al. |
| 6,080,353 A | 6/2000 | Tsuchiya |
| 2005/0140036 A1* | 6/2005 | Hirota ................. B65D 1/0223 |
| | | 264/40.1 |
| 2010/0078861 A1* | 4/2010 | Herklotz ................. B29C 49/12 |
| | | 264/532 |
| 2010/0156009 A1 | 6/2010 | Voth et al. |

FOREIGN PATENT DOCUMENTS

| | | |
|---|---|---|
| JP | H02 108517 A | 4/1990 |
| JP | H06-126820 A | 5/1994 |
| JP | 2002-067135 A | 3/2002 |
| JP | 2005-028681 A | 2/2005 |
| JP | 2006-035674 A | 2/2006 |
| WO | WO2013/74500 A1 | 5/2013 |
| WO | WO2013/74502 A1 | 5/2013 |

OTHER PUBLICATIONS

Supplemental EP Search Report in EP 12850480 dated Dec. 10, 2015.

Second Examination Report in EP 12850480 dated Jan. 20, 2017.

* cited by examiner

| Operation | CSR | Base with Overstroke | Stretch Rod | Mold | High Pressure | Low Pressure | Hot Air | Vacuum |
|---|---|---|---|---|---|---|---|---|
| | Up/Down | Up/Down | Up/Down | Open/Middle/Close | Open/Close | Open/Close | Open/Close | Open/Close |
| Comments | Operates as Normal but is Forced Downward Thus Depressing the Article into the Mold Past the Base | Delayed Operation for Overstroke and Additional Time for Touch Off on Article (cry. Growth) | Operates as Normal Unless Hot Air is Utilized (Will Remain up until Air Time is Complete) | Closes as Normal but is Opened to Middle Position to Assist With Latent Heat Transfer to Article (Additional Shrinkage) | | | | |
| | Servo Motor Driven | | | | N/C Solenoid Valves | | | |

Fig-2

| Operation | CSR | Base with Overstroke | Stretch Rod | Mold | High Pressure | Low Pressure | Hot Air | Balayage |
|---|---|---|---|---|---|---|---|---|
| | Up/Down | Up/Down | Up/Down | Open/Middle/Close | Open/Close | Open/Close | Open/Close | Open/Close |
| Comments | Operates as Normal | Delayed Operation for Overstroke and Additional Time for Air Cooling | Operates as Normal Unless Balayage is Utilized (Will Remain up until Air Time is Complete) | Traditional Operation | | | | |
| | ①②③ Servo Motor Driven | | | | ⑤⑥⑦⑧ N/C Solenoid Valves | | | |

Secondary Station I/O

PLURAL BLOW MOLDING WITH SERVO CONTROLS

CROSS-REFERENCE TO RELATED APPLICATIONS

This application claims the benefit of U.S. Provisional Application No. 61/560,098, filed on Nov. 15, 2011. The entire disclosure of the above application is incorporated herein by reference.

FIELD

This disclosure generally relates to a container and, more particularly, relates to a container formed via plural blow molding processes.

BACKGROUND

This section provides background information related to the present disclosure which is not necessarily prior art.

As a result of environmental and other concerns, plastic containers (more specifically polyester and even more specifically polyethylene terephthalate (PET) containers) are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material, $\rho_a$ is the density of pure amorphous PET material (1.333 g/cc), and $\rho_c$ is the density of pure crystalline material (1.455 g/cc). Once a container has been blown, a commodity may be filled into the container.

SUMMARY

This section provides a general summary of the disclosure, and is not a comprehensive disclosure of its full scope or all of its features.

A system for forming a container from a preform is disclosed. The system includes a first mold having a plurality of first portions that cooperate to define a first internal surface against which the preform is blown for forming a first form. The system also includes a second mold having a plurality of second portions that cooperate to define a second internal surface against which the first form is blown for forming a second form. Also, the system includes a mold servo motor that actuates the plurality of first portions relative to each other and/or actuates the plurality of second portions relative to each other. Furthermore, the system includes a controller that controls the mold servo motor for controlled actuation of the plurality of first portions and/or the plurality of second portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a chart illustrating the control of a first station of the molding system of FIG. 1; and FIG. 3 is a chart illustrating the control of a second station of the molding system of FIG. 1

Corresponding reference numerals indicate corresponding parts throughout the several views of the drawings.

DETAILED DESCRIPTION

Figure 1:
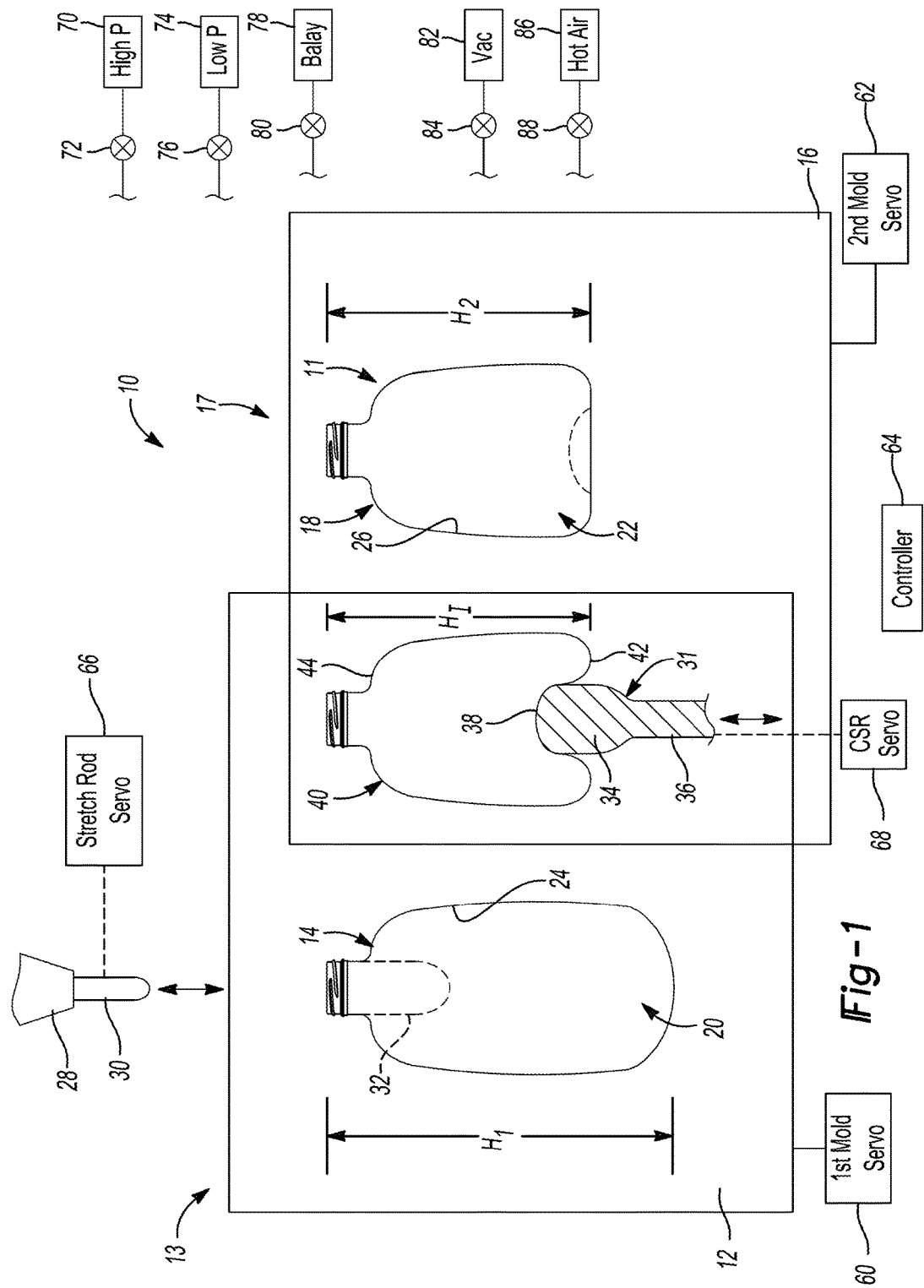
FIG. 1 is a schematic illustration of a molding system for molding a container according to exemplary embodiments of the present disclosure.

Example embodiments will now be described more fully with reference to the accompanying drawings.

Referring initially to FIG. 1, a molding system 10 is schematically illustrated according to exemplary embodiments of the present disclosure. As will be discussed, the system 10 can be used for forming a container 11 through a plurality of blow molding steps. The container 11 can be made of PET or another suitable material. In the embodiments illustrated, there can be two blow molding steps (i.e., double blow molding); however, there can be any number of blow molding steps without departing from the scope of the present disclosure.

The container 11 can have any suitable size and shape (e.g., approximately twenty-four ounce capacity). Also, the container 11 can be operable for hot filling, pasteurization, and/or retort processes. The plural molding operations can be designed to ensure that material of the container 11 is distributed in a desirable fashion, such that the container 11 has adequate crystallinity, such that the container 10 has adequate structural integrity, etc.

As shown, the molding system 10 can generally include a first station 13 having a first mold 12 for blow molding and formation of a first form 14 (i.e. primary article) of the container 11. The system 10 can also include a second station 17 having a second mold 16 for blow molding and formation of a second form 18 (i.e., a secondary article) of the container 11. In the embodiments illustrated, the second form 18 is the final form of the container 11 (i.e., no further blow molding occurs); however, in other embodiments, the second form 18 can be further blow molded to form the container 11.

It will be appreciated that the molding system 10 can have a plurality of first stations 13, each with a respective first mold 12 for forming a respective first form 14 substantially simultaneously with the other first forms 14. Likewise, the molding system 10 can have a plurality of second stations 17, each with a respective second mold 16 for forming a respective second form 18 substantially simultaneously with the other second forms 18. As such, the system 10 can be used for high volume manufacture of containers 11. Each of these stations 13, 17 can be independently controlled in the manner discussed below.

The first and second molds 12, 16 are represented schematically in FIG. 1 as individual squares. The molds 12, 16 are shown overlapping for purposes that will be discussed below. It will be appreciated that the first mold 12 can include a plurality of mold portions that cooperate to define inner surfaces 24 of an internal cavity 20. Also, it will be appreciated that the second mold 16 can include a plurality of mold portions that cooperate to define inner surfaces 26 of an internal cavity 22. The shape of the first form 14 can correspond to the shape of the inner surfaces 24 of the internal cavity 20, and the shape of the second form 18 can correspond to the shape of the inner surfaces 26 of the internal cavity 22. The cavities 20, 22 can have any suitable shape for blow molding the first and second forms 14, 18 as desired.

The system 10 can also include an actuator, such as a first mold servo motor 60, which is operably coupled to the first mold 12. The first mold servo motor 60 can be operable for opening and closing the first mold 12. More specifically, the servo motor 60 can move the portions of the first mold 12 relative to each other to open and close the first mold 12 and/or can actuate clamps or other devices that selectively retain the portions of the first mold 12 together in the closed position. The first mold servo motor 60 can provide a high degree of control over the opening and closing of the first mold 12. For instance, the first mold servo motor 60 can be used to control the speed of opening and closing the first mold 12, the timing of opening and closing the first mold 12, etc. These variables can be changed according to the particular molding process such that the first form 14 of the container 11 can have desired qualities as will be discussed in greater detail below. Although the first servo motor 60 includes one or more servo motors, other actuators could be employed for opening and closing the first mold 12.

The first mold servo motor 60 can be in operative communication with a controller 64. The controller 64 can be a personal computer or other type of programmable device having one or more input devices (e.g., keyboard, mouse, etc.), output devices (e.g., a monitor or display, speaker, etc.), computerized memory (RAM and/or ROM), programmed logic, etc. With the controller 64, the user can input controls for changing the speed, timing, and/or other control variables of the first servo motor 60 (i.e., controlled actuation of the portions of the first mold 12).

The system 10 can additionally include a second mold servo motor 62 that is operably coupled to the second mold 16. Like the first mold servo motor 60, the second servo motor 62 can control the opening and closing of the second mold 16. The second mold servo motor 62 can also be in operative communication with the controller 64 for changing the control variables of the second mold servo motor 62. Although the second servo motor 62 includes one or more servo motors, other actuators could be employed for opening and closing the second mold 16.

As mentioned above, the system 10 can include a plurality of stations 13, 17, each with a respective mold 12, 16. Each mold 12, 16 can include a respective servo motor 60, 62, and each servo motor 60, 62 can be controlled by the controller 64. Thus, multiple containers can be manufactured at once. The controller 64 can also control the servo motors 60, 62 and change operating variables (speed and timing for opening and closing, etc.) as necessary, and the controller 64 can compensate for time variations, temperature variations, etc.

The system 10 can further include one or more blow nozzles 28. The blow nozzle 28 can be of a known type that introduces a fluid (air) into the first mold 12 to create the first form 14. The blow nozzle 28 can also subsequently introduce fluid into the second mold 16 to create the second form 18. In some embodiments, the same blow nozzle 28 forms the first form 14 and the second form 18, but in other embodiments, there are individual blow nozzles 28 that form the first and second forms 14, 18.

The system 10 can additionally include a stretch rod 30. The stretch rod 30 can be of a known type and can be moveably attached to the blow nozzle 28. Specifically, the stretch rod 30 can move linearly toward and away from the blow nozzle 28 and into and out of the first and/or second molds 12, 16 during formation of the first form 14 and/or formation of the second form 18 as will be discussed in greater detail.

Moreover, the system 10 can include a stretch rod servo motor 66. The stretch rod servo motor 66 can be operably connected to the stretch rod 30 for actuating the stretch rod 30 relative to the blow nozzle 28. The stretch rod servo motor 66 can be in operative communication with the controller 64 such that the speed, timing, position, and other control variables of the stretch rod servo motor 66 can be controlled and varied by the user. Although the stretch rod servo motor 66 includes one or more servo motors, other actuators could be employed for actuating the stretch rod 30.

Furthermore, the system 10 can include a counter stretch rod 31. The counter stretch rod 31 can be of a known type with an enlarged head 34 and a shaft 36 extending away from the head 34. The head 34 can also include a terminal end surface 38 that faces away from the shaft 36. The counter stretch rod 31 can move inside either the first mold 12 or the second mold 16. (FIG. 1 shows the counter stretch rod 31 inside the overlapping area of the boxes representing the first and second molds 12, 16 to illustrate that the counter stretch rod 31 can move inside either the first mold 12 or the second mold 16.) Specifically, the counter stretch rod 31 can move linearly (e.g., up and down) within the internal cavity 20, 22 of the respective mold 12, 16. In other embodiments, the counter stretch rod 31 can be located outside the first and second molds 12, 16.

As will be discussed, the counter stretch rod 31 can be used to reduce a first height $H_1$ of the first form 14. Specifically, the counter stretch rod 31 can push a base 42 of the first form 14 toward an upper end 44 of the first form 14 to reduce the first height $H_1$ and form an intermediate form 40 having an intermediate height $H_I$. Then, the intermediate form 40 can be loaded inside the second mold 16 to form the second form 18 to a second height $H_2$. As shown in FIG. 1, the second height $H_2$ can be less than the first height $H_1$, and the intermediate height $H_I$ can be less than the second height $H_2$.

Moreover, the system 10 can include a counter stretch rod servo motor 68. The counter stretch rod servo motor 68 can be operably connected to the counter stretch rod 31 for actuating the counter stretch rod 31. The counter stretch rod servo motor 68 can be in operative communication with the controller 64 such that the speed, timing, position, and other control variables of the counter stretch rod servo motor 68 can be controlled and varied by the user. Although the counter stretch rod servo motor 68 includes one or more servo motors, other actuators could be employed for actuating the counter stretch rod 31.

The system 10 can additionally include a high pressure fluid source 70 (e.g., high pressure air). The high pressure fluid source 70 can be in fluid communication with the blow nozzle 28 such that the blow nozzle 28 can supply high pressure fluid into the internal cavity 20 of the first mold 12 and/or the internal cavity 22 of the second mold 16. The flow of high pressure fluid can be controlled by a solenoid valve 72. The solenoid valve 72 can be in communication with the controller 64. Also, the controller 64 can be used to vary the timing, etc. of when the valve 72 switches ON and OFF. It will be appreciated that there can be more than one high pressure air source 70, each with respective valves 72, and each source 70 can be dedicated to supplying fluid to one of the first mold 12 and the second mold 16. Also, it will be appreciated that flow from the high pressure fluid source 70 could be controlled using means other than the solenoid valve 72.

Additionally, the system 10 can include a low pressure fluid source 74 (e.g., low pressure air). The low pressure fluid source 74 can be in fluid communication with the blow nozzle 28 such that the blow nozzle 28 can supply low pressure fluid into the internal cavity 20 of the first mold 12 and/or the internal cavity 22 of the second mold 16. The flow of low pressure fluid can be controlled by a solenoid valve 76. The solenoid valve 76 can be in communication with the controller 64. Also, the controller 64 can be used to vary the timing, etc. of when the valve 76 switches ON and OFF. It will be appreciated that there can be more than one low pressure air source 74, each with respective valves 76, and each source 74 can be dedicated to supplying fluid to one of the first mold 12 and the second mold 16. Also, it will be appreciated that flow from the low pressure fluid source 74 could be controlled using means other than the solenoid valve 76.

The system 10 can further include a balayage fluid source 78 (e.g., balayage air source). The balayage fluid source 78 can be in fluid communication with the blow nozzle 28 and/or the stretch rod 30 to supply air to the second mold 16 (e.g., to provide heated air to specific areas of the second form 18). The flow of balayage fluid can be controlled by a solenoid valve 80. The solenoid valve 80 can be in communication with the controller 64. Also, the controller 64 can be used to vary the timing, etc. of when the valve 80 switches ON and OFF. Additionally, it will be appreciated that flow from the balayage fluid source 78 could be controlled using means other than the solenoid valve 80.

Still further, the system 10 can include a vacuum source 82. The vacuum source can be in fluid communication with the internal cavity 20 of the first mold 12 and/or the internal cavity 22 of the second mold 16. Whether or not the vacuum is applied can be regulated by a solenoid valve 84 or other type of valve. The solenoid valve 84 can be in operative communication with the controller 64. Also, the controller 64 can be used to vary the timing, etc. of when the valve 84 switches ON and OFF.

Furthermore, the system 10 can include a hot air source 86. The hot air source 86 can be in fluid communication with the first mold 12 and/or the second mold 16 to supply hot air and heat thereto as will be described in greater detail below. The flow of hot air from the source 86 can be controlled by a solenoid valve 88 or other type of valve. The solenoid valve 88 can be in operative communication with the controller 64 for controlling the timing, etc. of switching the valve 88 ON and OFF.

Manufacture of the container 11 will now be discussed in greater detail. To form the container 11, a preform 32 (shown in phantom in FIG. 1) can be positioned inside the first mold 12. Then, the blow nozzle 28 can operably couple to the preform 32 and/or the first mold 12, and the stretch rod servo motor 66 can actuate the stretch rod 30 into the preform 32 to stretch the preform 32 within the first mold 12. Next, one or each valve 72, 76 can open to allow high and/or low pressure fluid (air) to blow through blow nozzle 28 and into the preform 32 to propel the material of the preform 32 against the inner surface 24 of the first mold 12 to create the first form 14. The valve 84 can be also be opened at a predetermined time to provide the vacuum to the first mold 12, and the valve 88 can also be opened at a predetermined time to provide hot air and heat to the first mold 12. The controller 64 can also cause the valves 72, 76, 84, 88 to close at predetermined times as well.

It will be appreciated that the first form 14 can be stretch blow molded from the preform 32. However, the first form 14 can be created via extrusion blow molding, injection blow molding, or in any other manner without departing from the scope of the present disclosure.

Next, the counter stretch rod servo motor 68 can actuate the counter stretch rod 31 to push the base 42 of the first form 14 toward the upper end 44 to reduce the height $H_1$ to the intermediate height $H_I$. As mentioned above, the counter stretch rod 31 can be used inside the first mold 12; therefore, the counter stretch rod 31 can shorten the intermediate form 40 such that the intermediate form 40 fits within the second mold 16. Also, as mentioned above, the counter stretch rod 31 can be used inside the second mold 16. In these embodiments, the counter stretch rod 31 can be used before the second mold 16 is fully closed to ensure that the intermediate form 40 fits within the second mold 16 when closed.

Assuming that the intermediate form 40 is still in the first mold 12, the first mold servo motor 60 can cause the first mold 12 to open such that the intermediate form 40 can be moved from the first mold 12 to the second mold. Once the intermediate form 40 is positioned therein, the second servo motor 62 can close the second mold for forming the second form 18. Alternatively, assuming that the counter stretch rod 31 is used in the second mold 16, the first form 14 can be removed from the first mold 14, placed within the open second mold 16, and the counter stretch rod servo motor 68 can actuate the counter stretch rod 31 to form the intermediate form 40. Then, the second mold servo motor 62 can close the second mold 16 for forming the second form 18.

Subsequently, one or both valves 72, 76 can be opened to blow high and/or low pressure fluid into the second mold 16 through the blow nozzle 28. As such, the material of the intermediate form 40 can be blown against the inner surfaces 26 of the second mold 16 to create the second form 18. Also, the valve 80 can be opened at one or more predetermined times to supply the balayage air inside the second mold 16. Likewise, the valves 84, 88 can be opened at predetermined times to provide the vacuum and hot air (heat), respectively, to the second mold 16. Heat can be transferred to the second form 18 and/or the second form 18 can be held for a predetermined time inside the second mold 16 to ensure proper crystallinity of the second form 18. Then, the second form 18 can be removed from the second mold 16, and the second form 18 can be processed further (e.g., can be labeled or otherwise marked, etc.) for completing the container 11. Then, the container 11 can be filled with a commodity (not shown). A cap (not shown) or other closure can also be attached to the container 11 to thereby seal the commodity therein.

Furthermore, in some embodiments, the counter stretch rod 31 and the stretch rod 30 can be used cooperatively, for instance, to hold the base 42. For instance, the counter stretch rod 31 and the stretch rod 30 can be positioned to coincidentally abut against opposite surfaces of the base 42 to hold the intermediate form 40 in a substantially fixed position within the second mold 16. As such, even though the intermediate form 40 may be larger than the internal cavity 22 off the second mold 16, the intermediate form 40 can limit movement of the intermediate form 40 therein. It will be appreciated that other means can be employed for limiting movement of the intermediate form 40 within the second mold 16 as well.

Referring to FIGS. 2 and 3, the method of blow molding using the system 10 discussed above is illustrated in more detail. As shown, FIG. 2 lists the controlled operations relating to blow molding in the first mold 12. As shown in columns 1 and 2, the counter stretch rod servo motor 68 can actuate the counter stretch rod 31 up and down at predetermined times and speeds to reduce the height of the container 11. As shown in column 3, the stretch rod servo motor 66 can actuate the stretch rod 30 up and down at predetermined times and speeds. Also, as shown in column 3, if hot air is provided from the source 86, the stretch rod 30 will remain up until the valve 88 closes off the supply of hot air. Furthermore, as shown in column 4, the first mold servo motor 60 can actuate the portions of the first mold 12 between an open, middle, and closed position. The preform 32 can be placed in the first mold 12 when in the open position, and the first form 14 can be formed when the first mold 12 is in the closed position. In the middle position, the first mold 12 can remain closed, and hot air 86 can continue to be provided to maintain the temperature inside the first mold 12 such that crystal growth is promoted. Moreover, as shown in columns 5-8, the solenoid valves 72, 76, 84, and 88 are opened and closed at predetermined times.

As shown in FIG. 3, operations at the second mold 16 can be similarly controlled. However, as shown in columns 3 and 8, the balayage fluid source 78 can be utilized at the second mold 16. As stated, the valve 80 can be controlled to open and close at predetermined times.

Thus, the system 10 can provide a high degree of control over the blow molding of the container 11. The control variables can be changed according to the dimensions, materials, or other characteristics of the particular container 11. Moreover, manufacturing can be largely (if not completely) automated once these control variables are programmed into the controller 64.

It will be appreciated that the servo motors 60, 62, 66, 68 can be part of circuits that are independent from each other. Also, these servo motors 60, 62, 66, 68 can be part of circuits that are independent of the pneumatic valves 72, 76, 80, 84, 88. Other electrical circuits of the system 10 can be similarly independent. Accordingly, the system 10 can be highly controllable.

The system 10 can be used to increase the processing window for the user while producing high crystalline containers 11. This can be especially useful in cases in which a finish of the container 11 is formed by blow molding (instead of being included on the preform 32). Additionally, the use of servo controls can allow for increased stretching and subsequent increase with the in-mold time. Also, because of the separate circuits described above, the system 10 can provide the user with valuable processing tools for using, for instance, lightweight stock preforms 32. In some embodiments, the user can have infinite control over the variables of operating the system 10. Finally, in-mold times inside the first and second molds 12, 16 can be different from each other, such that the first and second forms 14, 18 of the container 11 can be manufactured as desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for forming a container from a preform comprising:
    a first mold having a plurality of first portions that cooperate to define an first internal surface against which the preform is blown for forming a first form;
    a second mold having a plurality of second portions that cooperate to define a second internal surface against which the first form is blown for forming a second form;
    a first mold servo motor that actuates the plurality of first portions relative to each other;
    a second mold servo motor that actuates the plurality of second portions relative to each other; and
    a controller configured to individually control the first mold servo motor for controlled actuation of the plurality of first portions, and the second mold servo motor for controlled actuation of the plurality of second portions;
    wherein the controller is configured to individually control the first mold servo motor and the second mold servo motor to control opening and closing speed, and opening and closing timing, of the first mold and the second mold individually, by sending different control signals to each of the first mold servo motor and the second mold servo motor.

2. The system of claim 1, further comprising a stretch rod that moves within one of the first mold and the second mold to stretch the corresponding one of the preform and the first form, and further comprising a stretch rod servo motor that actuates the stretch rod within the one of the first and second molds, the controller operable to control the stretch rod servo motor.

3. The system of claim 1, further comprising a counter stretch rod that moves within one of the first mold and the second mold to stretch a base of the container, and further comprising a counter stretch rod servo motor that actuates the counter stretch rod within the one of the first and second molds, the controller operable to control the stretch rod servo motor.

4. The system of claim 1, further comprising at least one fluid supply that is in fluid communication with at least one of the first mold and the second mold, and a fluid supply solenoid valve that regulates flow from the at least one fluid supply into the at least one of the first mold and the second mold, the controller further operable to control the fluid supply solenoid valve.

5. The system of claim 4, wherein the at least one fluid supply includes a high pressure fluid supply, a low pressure fluid supply, and a balayage fluid supply.

6. The system of claim 1, further comprising a vacuum source that is in fluid communication with at least one of the first mold and the second mold, and a vacuum source solenoid valve that regulates vacuum pressure applied to the at least one of the first mold and the second mold, the controller further operable to control the vacuum source solenoid valve.

7. The system of claim 1, further comprising a hot air source that is in fluid communication with at least one of the first mold and the second mold, and further comprising a hot air solenoid valve that regulates hot air delivered from the hot air source to the at least one of the first mold and the second mold, the controller further operable to control the hot air solenoid valve.

8. A method for forming a container from a preform comprising:
    blow molding a first form from the preform inside a plurality of first portions of a first blow mold;
    opening and closing the first portions of the first blow mold with a first mold servo motor;
    blow molding a second form from the first form inside a plurality of second portions of a second blow mold;
    opening and closing the second portions of the second blow mold with a second mold servo motor;
    individually controlling the first and second mold servo motors with a controller to individually control the opening and closing of the first and second blow molds; and
    individually controlling the opening and closing speed, and opening and closing timing, of the first and second blow molds with the controller, by sending different control signals to each of the first mold servo motor and the second mold servo motor.

9. The method of claim 8, further comprising controlling movement of a stretch rod within one of the first mold and the second mold using a stretch rod servo motor to stretch the corresponding one of the preform and the first form.

10. The method of claim 8, further comprising controlling movement of a counter stretch rod within one of the first mold and the second mold using a counter stretch rod servo motor to stretch the corresponding one of the preform and the first form.

11. The method of claim 8, further comprising regulating flow of a fluid from a fluid supply into at least one of the first mold and the second mold using a fluid supply solenoid valve.

12. The method of claim 11, wherein the at least one fluid supply includes a high pressure fluid supply, a low pressure fluid supply, and a balayage fluid supply.

13. The method of claim 8, further comprising regulating vacuum pressure inside at least one of the first mold and the second mold using a vacuum source solenoid valve.

14. The method of claim 8, further comprising regulating flow of a hot air from a hot air source into at least one of the first mold and the second mold using a hot air solenoid valve.

15. A system for forming a plurality of containers, the plurality of containers being formed from a respective preform, the system comprising:
    a plurality of first molds, each of the plurality of first molds having a plurality of first portions that cooperate to define an first internal surface against which the respective preform is blown for forming a first form;
    a plurality of second molds, each of the plurality of second molds having a plurality of second portions that cooperate to define a second internal surface against which a respective one of the first forms is blown for forming a second form;
    a plurality of first mold servo motors, each of the plurality of first mold servo motors operable to actuate the plurality of first portions of one of the plurality of first molds relative to each other;
    a plurality of second mold servo motors, each of the plurality of second mold servo motors operable to actuate the plurality of second portions of one of the plurality of second molds relative to each other;
    a controller that controls the plurality of first mold servo motors and that controls the plurality of second mold servo motors for controlled actuation of the first portions and the second portions, by sending different control signals to each of the first mold servo motor and the second mold servo motor.

16. The system of claim 1, further comprising:
    a stretch rod servo motor configured to actuate a stretch rod, a counter stretch rod servo motor configured to actuate a counter stretch rod, a high pressure solenoid valve configured to regulate flow of high pressure fluid to at least one of the first mold and the second mold, a low pressure solenoid valve configured to regulate flow of low pressure fluid to at least one of the first and second molds, a balayage fluid solenoid valve configured to regulate flow of balayage fluid to at least one of the first and second molds, a vacuum source solenoid valve configured to control vacuum pressure applied to at least one of the first and second molds, a hot air solenoid valve configured to regulate hot air delivered from a hot air source to at least one of the first and second molds;
    wherein the controller is configured to individually control each one of the stretch rod servo, the counter stretch rod servo, the high pressure solenoid valve, the low pressure solenoid valve, the balayage fluid solenoid valve, the vacuum source solenoid valve, and the hot air solenoid valve; and
    wherein the controller is configured to control the first and second mold servo motors such that during formation of the container the first mold servo motor maintains the first mold closed longer than the second mold servo motor maintains the second mold closed.

17. The method of claim 8, further comprising:
    maintaining the first portions of the first blow mold closed for a first time period during blow molding the first form; and
    maintaining the second portions of the second blow mold closed for a second time period during blow molding the second form, the first time period is longer than the second time period.

* * * * *